United States Patent [19]

Rikard

[11] Patent Number: 5,737,868
[45] Date of Patent: Apr. 14, 1998

[54] WEIGHTED FISHING BOBBER

[76] Inventor: Dennis Rikard, P.O. Box 1090, Warsaw, Mo. 65355

[21] Appl. No.: 744,637

[22] Filed: Nov. 6, 1996

[51] Int. Cl.$^6$ .................................................. A01K 93/00
[52] U.S. Cl. .................... 43/44.92; 43/44.93; 43/43.14
[58] Field of Search ........................ 43/44.9, 44.91, 43/44.92, 44.93, 44.95, 17, 43.14, 43.1

[56] References Cited

U.S. PATENT DOCUMENTS

| | | | |
|---|---|---|---|
| 2,163,483 | 6/1939 | Carlisle | 43/44.95 |
| 4,139,960 | 2/1979 | Chojnowski | 43/15 |
| 4,357,775 | 11/1982 | Click | 43/15 |
| 4,748,764 | 6/1988 | Hammons | 43/15 |
| 5,241,774 | 9/1993 | Rayburn | 43/44.92 |
| 5,377,444 | 1/1995 | Gibney, Sr. | 43/44.91 |
| 5,398,440 | 3/1995 | Amundsen | 43/15 |
| 5,412,902 | 5/1995 | Hicks | 43/44.92 |

FOREIGN PATENT DOCUMENTS 588753  3/1925  France ................................. 43/43.14

Primary Examiner—Jack W. Lavinder
Attorney, Agent, or Firm—Patent & Trademark Services; Thomas Zack; Joseph H. McGlynn

[57] ABSTRACT

A floatable bobber used to support an insertable fishing line in water. The bobber has a central one piece elongated plastic section with a T shaped slot at its lower section in which a fishing line may be inserted. Surrounding this section at its lower end is a slidable rubber sleeve used to hold the in-place fishing line. Further up the bobber is an enlarged foam section with internal weights. These weights are configured in a triangular shape with the one piece section extending through the middle of the triangle. When a fish is caught, tension is applied to the in-place fishing line to upright the attached normally prone floating bobber to indicate and alert a user to a potential catch.

5 Claims, 1 Drawing Sheet

WEIGHTED FISHING BOBBER

BACKGROUND OF THE INVENTION

Fishing buoys or bobs are designed to float in water and to inform the user that a fish in pulling on the submerged line. In response, the user is expected to take action such as grasping the fishing pole and starting to reel-in the hooked fish. Such bobbers can take on a variety of shapes and sizes. The present bobber invention is configured generally like a top which rests prone in water until its fishing line is tensioned at which time it is up righted to a standing alert position. Internal weights configured in a triangular pattern are used to help balance the bobber. A bottom stem slot mounts the fishing line to the bobber while a slidable bobber sleeve can be used to encompass this slot to maintain the fishing line in-place on the bobber.

DESCRIPTION OF THE PRIOR ART

Inventions relating to buoys and fishing bobbers are well known. For example, U.S. Pat. No. 4,139,960 to Chojnowski discloses a fishing bob which lays down while waiting for a fish to strike and which pivots uprights to indicate a fish is on the line. U.S. Pat. No. 4,357,775 to Click has an off-center weighted base to hold the bob in one position and can be pivoted to a second position when a fish takes the bait. The Hammons invention (U.S. Pat. No. 4,748,764) discloses a fishing accessory having a buoyant weighted upper body with a blade and a lower submerged body with a line and hook attached. Pulling on the fishing line results in jiggling of the hook. And in U.S. Pat. No. 5,398,440 to Amundsen a fishing bobber having a buoyant body with a hydrodynamic body and a central hollow shaft through which a fishing line is passed is disclosed. The present invention differs from these and other known prior art bobbers by providing for a lower body fishing line attachment slot which can be covered by a slidable sleeve to hold the line thereto as more further set forth in this specification.

SUMMARY OF THE INVENTION

This invention relates to a fishing line buoy or bobber having an elongated floatable body. The body's lower section has a slot therein which is adapted to receive a fishing line. A slidable sleeve encircles the lower section and can be moved to cover the slot and maintain the line in-place. Weights within the body maintain its balance while floating. When a hooked fish tensions the in-place line, the bobber is up righted to alert its user of the catch.

It is the primary object of the present invention to provide for an improved fishing bob.

Another object is to provide for a bob which will alert a user by up righting itself when a fish is caught.

These and other objects and advantages of the present invention will become apparent to readers from a consideration of the ensuing description and the accompanying drawings.

DESCRIPTION OF THE PREFERRED EMBODIMENT

Figure 1:
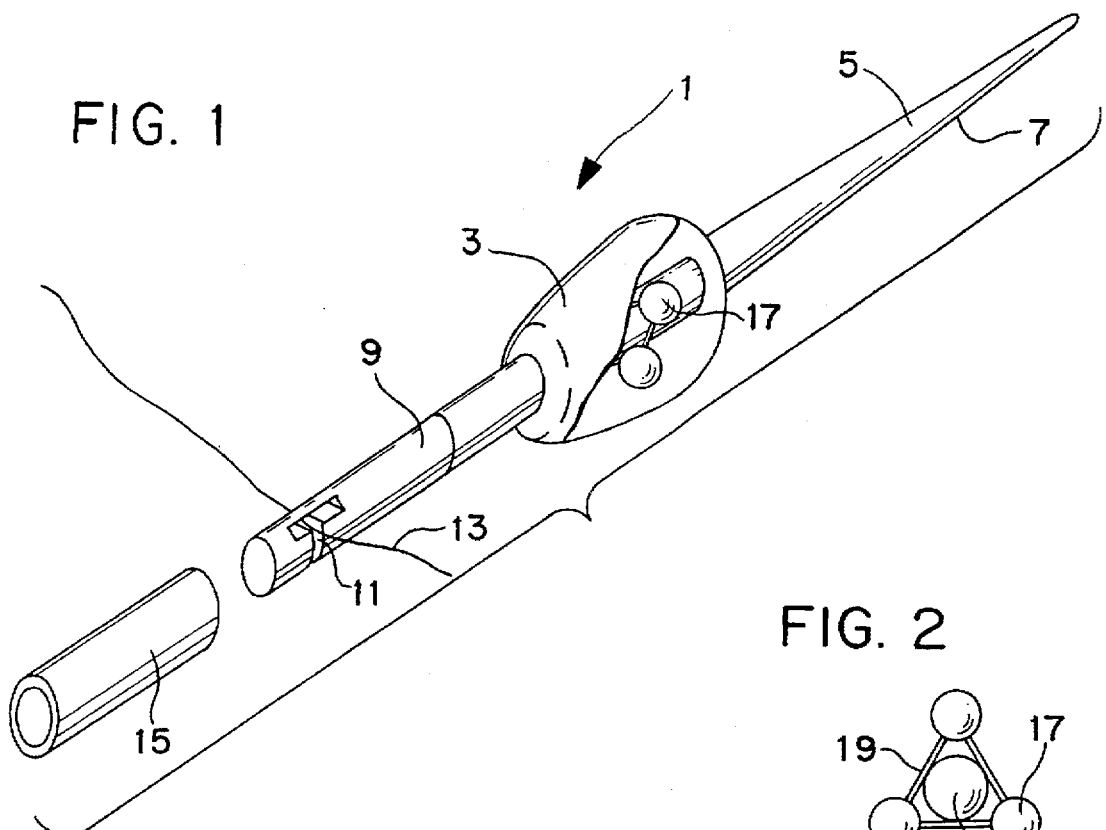
FIG. 1 is a side perspective view of the invention's preferred embodiment with a portion of its enlarged section cut-away.

FIG. 1 is a side perspective view of the invention's preferred embodiment. The bobber body 1 has a main enlarged foam body member 3 fixed to it which is intersected by an elongated plastic stem 5 such that both members may float when immersed in water. The injection molded ABS (Acrylonitrile-butadiene-styrene) plastic stem 5 is made from one piece having a sharped front section 7 and a cylindrical rear or lower section 9 with a generally uniform cross sectional diameter. Located near the end of its lower section is a formed cut-out opened slot or notch 11 through which a fishing line 13 can be inserted permit it to reside in the interior of the stem's lower section 9. The formed retaining slot is generally "T" shaped with the opened based leg section used to receive the fishing line and an upper intersecting member with two closed ends. A cylindrical hollow silicone rubber sleeve 15 fits snugly over the stem's lower free end section 15 such that it can be slide over the slot 11 to cover it. When the sleeve is placed over the slot 11 to cover it, any engaged in-place fishing line 13 is held to the stem's section 9.

Figure 2:
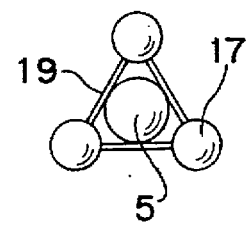
FIG. 2 is a detailed view of the triangular configurated weights used in the FIG. 1 embodiment.

Within the enlarged foam body member 3 are three small interconnected lead weights 17 that are affixed to and surround the adjacent section of stem 5. These weights are used to provide balance to the bobber or buoy when it floats in water. The FIG. 1 cut away section of member 3 shows how the weights are disposed around the diameter of the stem's section while FIG. 2 is a detailed view of the joined triangular configurated weights. Each lead weight is made up of a sphere with the same sized and weight which is joined to the other two weights by intersecting rigid members 19 such that all weights are equally spaced in a triangular configuration from each other around the stem.

Figure 3:
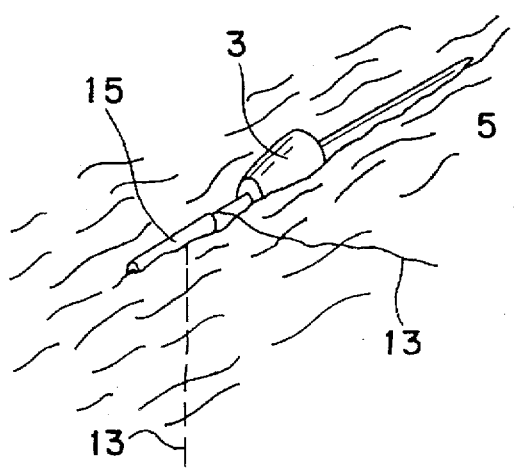
FIG. 3 shows a side view of the preferred embodiment while prone in water before a catch.
Figure 4:
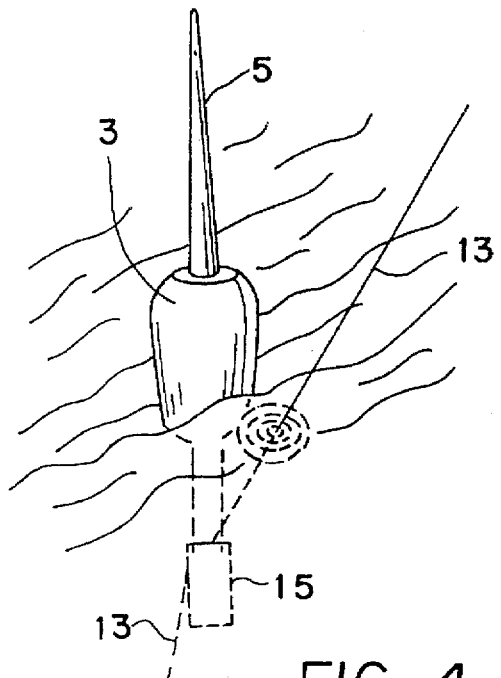
FIG. 4 shows FIG. 3 embodiment after a fish has been caught and tensioned the fishing line.

FIG. 3 shows a side view of the preferred embodiment while prone in water before a catch on line 13. The sleeve 15 has been slide up on the stem section 9 to cover the slot 11 and to hold the fishing line 13. Normally, a weight or sinker (not shown) attached to line's lower submerged end along with a baited hook are used to attract fish. After a fish bites and is hooked, the stem's end with sleeve 15 on it is pulled down by the fish supplied line tension resulting in the buoy up righting itself as shown in FIG. 4. As shown in this figure, the submerged sleeve 15 and lower line 13 section are shown by dotted lines with the line's submerged part extending downwardly towards the water's bottom. The up righting buoy action alerts the user to a potential catch who may then start to take action to reel-in the fish. This is analogous to saying the dinner bell has rung when the bobber upright's itself when there is a potential caught fish.

The foam top member 3 may be colored and textured to resemble balsa wood, for example, or any other desired object or material. This float body 3 may be made by injecting a polyurethane foam under low pressure. Polyurethane foam is a two part chemical mix which when brought together, begins to form a foaming material. Once allowed to completely cure, usually within a few minutes, a foam product is formed. In this process, the two components are injected into a mold having the desired end product shape (e.g., the top shape of member 3 with a central hole for latter insertion of the stem 5). When doing so, the FIG. 2 cast lead weights are first placed in the exact position around the formed hole in the mold where they will remain for the life of the formed product.

The lead weights are cast in the shown triangular configuration by pouring molten lead into a mold in the exact shape described. Using a triangular configuration of connected weights allows for an exact weight placement pattern and consistency. Once, the foam member 3 and balancing weights 17 are molded together, the stem 5 is slide through the central openings formed in the foam member and triangular configuration formed by the joined weights.

The one piece stem 5 and its shaped slot 11 can be made by the plastic injection molding process. Injection molding is a plastic molding process whereby heat softened plastic material is forced under very high pressure into a metal cavity mold, usually aluminum or steel, which is relatively cool. The inside cavity of the mold is comprised of two or more halves, and is the same desired shape as the product to be formed (in this case the slotted stem). High pressure hydraulics are used to keep the mold components together during the actual injection phase of the molding process. The injected plastic is allowed to cool and harden in the mold. The hydraulics holding the multiple component mold cavity together are released, the mold halves are separated and the solid formed plastic item is removed. Injection molding can be highly automated process and is capable of producing extremely detailed parts at a very cost effective price. The process should be invaluable in producing this invention's stem 5 cost effectively.

The highly flexible and weather proof silicone rubber tubing used for the sleeve 15 can be purchased "off the shelf" as a separate item and cut to the desired sleeve length. A good source to consult to determine commercial suppliers for such tubing is the Thomas Register of American Manufacturers.

Although the present invention's preferred embodiment and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A fishing bobber comprising:

a floatable elongated body having a lower section with a slot therein, said slot being adapted to receive an insertable fishing line, and having an enlarged section located above said slot, said enlarged section having at least one weighted member therein used to maintain the body in balance while floating in water, said at least one weighted member is made up of three members joined in a triangular configuration; and a movable sleeve adapted to slide on said body's lower section to cover said slot whereby any inserted fishing line is held to said body.

2. The invention as claimed in claim 1, wherein said body has a central one piece elongated section having said slot therein in its lower section, said central section being encircled along its length by said body's enlarged section and the triangular configuration formed by the weight's three members.

3. The invention as claimed in claim 2, wherein said body's enlarged section is made of a foam plastic material formed around said weights.

4. The invention as claimed in claim 3, wherein slot formed in said one piece section is T shaped with an opened slot section to permit insertion of a fishing line therein.

5. The invention as claimed in claim 4, said sleeve is made of a rubber material and said central one piece elongated section is made of a plastic material by an injection molding process.

* * * * *